United States Patent
Ruy Frota de Souza

(10) Patent No.: US 7,625,161 B1
(45) Date of Patent: Dec. 1, 2009

(54) ROTARY CUTTING TOOL ASSEMBLY AND CUTTING INSERT AND TOOL SHANK THEREFOR

(75) Inventor: Filho Ruy Frota de Souza, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 12/188,383

(22) Filed: Aug. 8, 2008

(51) Int. Cl.
*B23B 51/02* (2006.01)
*B23B 51/06* (2006.01)

(52) U.S. Cl. .................... 408/227; 407/33; 407/34; 407/113; 408/713

(58) Field of Classification Search .................. 407/30, 407/33, 34, 66, 113–116; 408/227, 228, 408/230, 231, 233, 232, 226, 718
See application file for complete search history.

(56) References Cited

U.S. PATENT DOCUMENTS

| | | | |
|---|---|---|---|
| 6,059,492 A * | 5/2000 | Hecht | 408/144 |
| 6,485,235 B1 | 11/2002 | Mast et al. | |
| 6,582,164 B1 * | 6/2003 | McCormick | 408/226 |
| 6,695,551 B2 | 2/2004 | Silver | |
| 6,840,717 B2 | 1/2005 | Eriksson | |
| 7,070,367 B2 | 7/2006 | Krenzer | |
| 7,114,892 B2 | 10/2006 | Hansson | |
| 7,153,066 B2 * | 12/2006 | Schafer et al. | 407/30 |
| 7,309,196 B2 | 12/2007 | Ruy Frota de Souza | |
| 2002/0085887 A1 * | 7/2002 | Schneider et al. | 407/30 |
| 2003/0091400 A1 * | 5/2003 | Turcot et al. | 407/30 |
| 2003/0091403 A1 * | 5/2003 | Lindblom | 408/231 |
| 2005/0084352 A1 | 4/2005 | Borschert et al. | |
| 2006/0093449 A1 | 5/2006 | Hecht et al. | |

* cited by examiner

*Primary Examiner*—Will Fridie, Jr.
(74) *Attorney, Agent, or Firm*—Larry R. Meenan

(57) ABSTRACT

A tool shank and a replaceable cutting insert are provided for a rotary cutting tool assembly. The tool shank has a drive surface including a central portion, a first portion of generally planar shape extending away from the central portion and a second portion of generally planar shape extending away from the central portion in a direction generally transverse to a central axis of the tool shank. The replaceable cutting insert has a driven surface including another central portion, a first portion of generally planar shape extending away from the other central portion and a second portion of generally planar shape extending away from the other central portion in a direction generally transverse to a central axis of the insert. The central portion of the driven surface has a curved surface transitioning between the first portion and the second portion of the driven surface. A portion of the driven surface of the replaceable cutting insert is engaged by a corresponding portion of the drive surface of the tool shank.

25 Claims, 10 Drawing Sheets

ROTARY CUTTING TOOL ASSEMBLY AND CUTTING INSERT AND TOOL SHANK THEREFOR

BACKGROUND

1. Field of the Invention

The invention relates generally to rotary cutting tools and, more particularly, to drilling tools with a replaceable cutting insert. The invention also relates to cutting inserts and tool shanks for rotary cutting tools.

2. Background Information

The modern metalworking trade primarily uses twist drills to make borings. Depending on the application, these twist drills can differ in terms of their cutting material and geometry. Cutting materials traditionally used are increasingly being replaced by different types of cutting materials that have significantly higher resistance to abrasion. For relatively large drilling tools, however, a drill made entirely of such abrasion-resistant materials is generally too expensive, and is not economical in spite of its excellent cutting performance. Alternatives are twist drills in which a drill tip made of abrasion-resistant materials is permanently attached to a carrier tool that is generally made of cheaper, more traditional materials. The disadvantage of these tools, however, is that they can be repointed only to a limited extent. As soon as the relatively short cutting portion made of abrasion-resistant materials has been used up, the entire tool has to be scrapped.

To reduce overall costs and reduce or eliminate waste of material, it is advantageous to construct a drill with a replaceable cutting tip. Such replaceable cutting tips permit a user to replace the cutting tip when it is worn down without having to replace the entire drill. On drill bits of this type, a cutting head or insert is detachably fixed to a drill shaft either by a separate fastening mechanism or through structures on the insert and drill shank themselves that interact to retain the cutting insert in the shank and serve to transfer rotational forces from the shank to the insert. Such retention and rotation structures are subject to deformation and failure during service life due to concentration of stresses imposed during ordinary service. Such failures are undesirable, especially when involving a shank intended to be reused multiple times in conjunction with replaceable inserts.

There is, therefore, room for improvement in rotary cutting tools having replaceable cutting inserts, particularly in the shank members and replaceable cutting inserts therefor.

SUMMARY OF THE INVENTION

These needs and others are met by embodiments of the invention, which are directed to a cutting insert for a rotary cutting tool, a tool shank for a rotary cutting tool, and a rotary cutting tool assembly.

As one aspect of the invention, a cutting insert for a rotary cutting tool is provided. The rotary cutting tool including a tool shank having a first end portion and an opposite second end portion, the first end portion being configured to be inserted into a tool holder, and the opposite second end portion having a recess for accommodating the cutting insert and a drive surface adjacent the recess. The cutting insert comprises a body portion having a first end, an opposite second end, and a central axis. The opposite second end of the body portion being structured to be inserted into the recess of the opposite second end portion of the tool shank. The cutting insert further comprising a driven surface extending from the body portion generally away from the central axis. The driven surface comprises: a central portion, a first portion of generally planar shape extending away from the central portion in a direction generally toward the first end of the body portion, and a second portion extending away from the central portion in a direction generally transverse to the central axis. The central portion comprises a curved surface transitioning between the first portion and the second portion of the driven surface and a portion of the driven surface is structured to be engaged by a corresponding portion of the drive surface.

The portion of the driven surface may comprise the central portion and the second portion when the rotary cutting tool is cutting a workpiece. The first portion of the driven surface may be generally inclined at an angle with respect to the central axis. The portion of the driven surface may comprise the first portion of the driven surface when the rotary cutting tool is being withdrawn from a workpiece. The second portion may be generally declined at a declination angle with respect to a plane transverse to the central axis. The declination angle may be in a range of about 5 degrees to about 20 degrees. The first portion of the driven surface may be generally inclined at a first angle with respect to the central axis and the second portion of the driven surface may be generally declined at a second angle with respect to a plane transverse to the central axis.

As another aspect of the invention, a tool shank for a rotary cutting tool is provided. The rotary cutting tool including a cutting insert comprising a body portion having a first end, an opposite second end, and a first central axis. The cutting insert further comprising a driven surface extending from the body portion generally away from the first central axis. The tool shank comprising: a generally cylindrical body having a first end portion, an opposite second end portion, and a second central axis. The first end portion being structured to be inserted into a tool holder. The opposite second end portion comprising: a recess structured to accommodate the opposite second end of the cutting insert, and a drive surface adjacent the recess. The drive surface comprising: a central portion, a first portion of generally planar shape extending away from the central portion in a direction generally away from the body, and a second portion extending away from the central portion in a direction generally transverse to the central axis. The central portion comprising a curved surface transitioning between the first portion and the second portion of the driven surface and a portion of the central portion of the drive surface being structured to engage a corresponding portion of the driven surface.

The second portion of the drive surface may be structured to engage another corresponding portion of the driven surface when the rotary cutting tool is cutting a workpiece. The first portion of the drive surface may be generally inclined at an angle with respect to the second central axis. The first portion of the drive surface may be structured to engage another corresponding portion of the driven surface when the rotary cutting tool is being withdrawn from a workpiece. The second portion may be generally declined at a declination angle with respect to a plane transverse to the central axis. The declination angle may be in a range of about 5 degrees to about 20 degrees. The first portion of the drive surface may be generally inclined at a first angle with respect to the central axis and the second portion of the drive surface may be generally declined at a second angle with respect to a plane transverse to the second central axis. The recess of the tool shank may comprise a groove.

As a further aspect of the invention, a rotary cutting tool is provided. The rotary cutting tool comprising a tool shank and a cutting insert. The tool shank having a first end portion and an opposite second end portion. The first end portion being configured to be inserted into a tool holder and the opposite second end portion having a recess and a drive surface adjacent the recess. The cutting insert comprising: a body portion having a first end, an opposite second end, and a central axis, the opposite second end of the body portion being inserted into the recess of the opposite second end portion of the tool shank. The cutting insert further comprising a driven surface extending from the body portion generally away from the central axis. The driven surface comprising: a central portion, a first portion of generally planar shape extending away from the central portion in a direction generally toward the first end of the body portion, and a second portion extending away from the central portion in a direction generally transverse to the central axis. The central portion comprising a curved surface transitioning between the first portion and the second portion of the driven surface and a portion of the driven surface being engaged by a corresponding portion of the drive surface.

The portion of the driven surface may comprise the central portion and the second portion when the rotary cutting tool is cutting a workpiece. The first portion of the driven surface may be generally inclined at an angle with respect to the central axis. The portion of the driven surface may comprise the first portion of the driven surface when the rotary cutting tool is being withdrawn from a workpiece. The second portion may be generally declined at a declination angle with respect to a plane transverse to the central axis. The declination angle may be in a range of about 5 degrees to about 20 degrees. The first portion of the driven surface may be generally inclined at a first angle with respect to the central axis and the second portion of the driven surface may be generally declined at a second angle with respect to a plane transverse to the central axis. The recess of the tool shank may comprise a groove.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
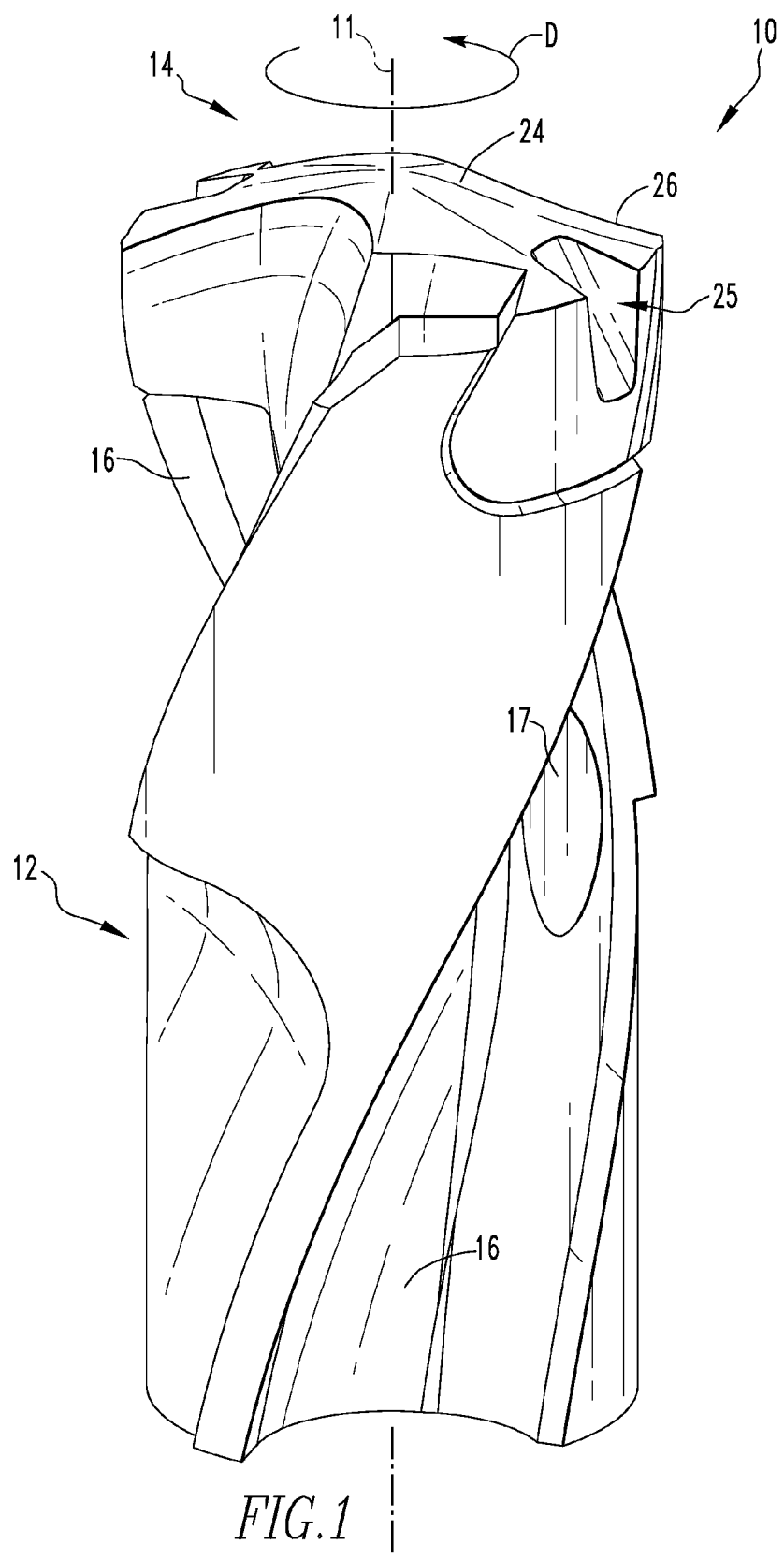
FIG. 1 is an isometric view of a rotary cutting tool assembly in accordance with an embodiment of the invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

FIG. 1 shows an example of a cutting tool assembly 10, in accordance with one non-limiting embodiment of the invention, for conducting rotary cutting operations on a work piece (not shown) when tool assembly 10 is rotated about a central longitudinal axis 11 in a direction D. A recessing, milling or reaming tool, for example, may be similarly configured. The cutting tool assembly 10 includes a shank 12 and a replaceable cutting insert 14 which is installed on, and engages the tool shank 12. Cutting tool assembly 10 is a modular drill which is preferably of the so-called twist drill type, having helical flutes 16 disposed along the sides of the cutting tool assembly 10. In the example of FIG. 1, two flutes 16 are provided in diametric opposition to one another. It is to be appreciated that the number of flutes 16 may be varied within the scope of the invention as desired for a particular cutting operation. It is further to be appreciated that such flutes 16 may include one or more coolant passages 17 for providing cooling to the cutting tool assembly and associated workpiece.

Figure 2:
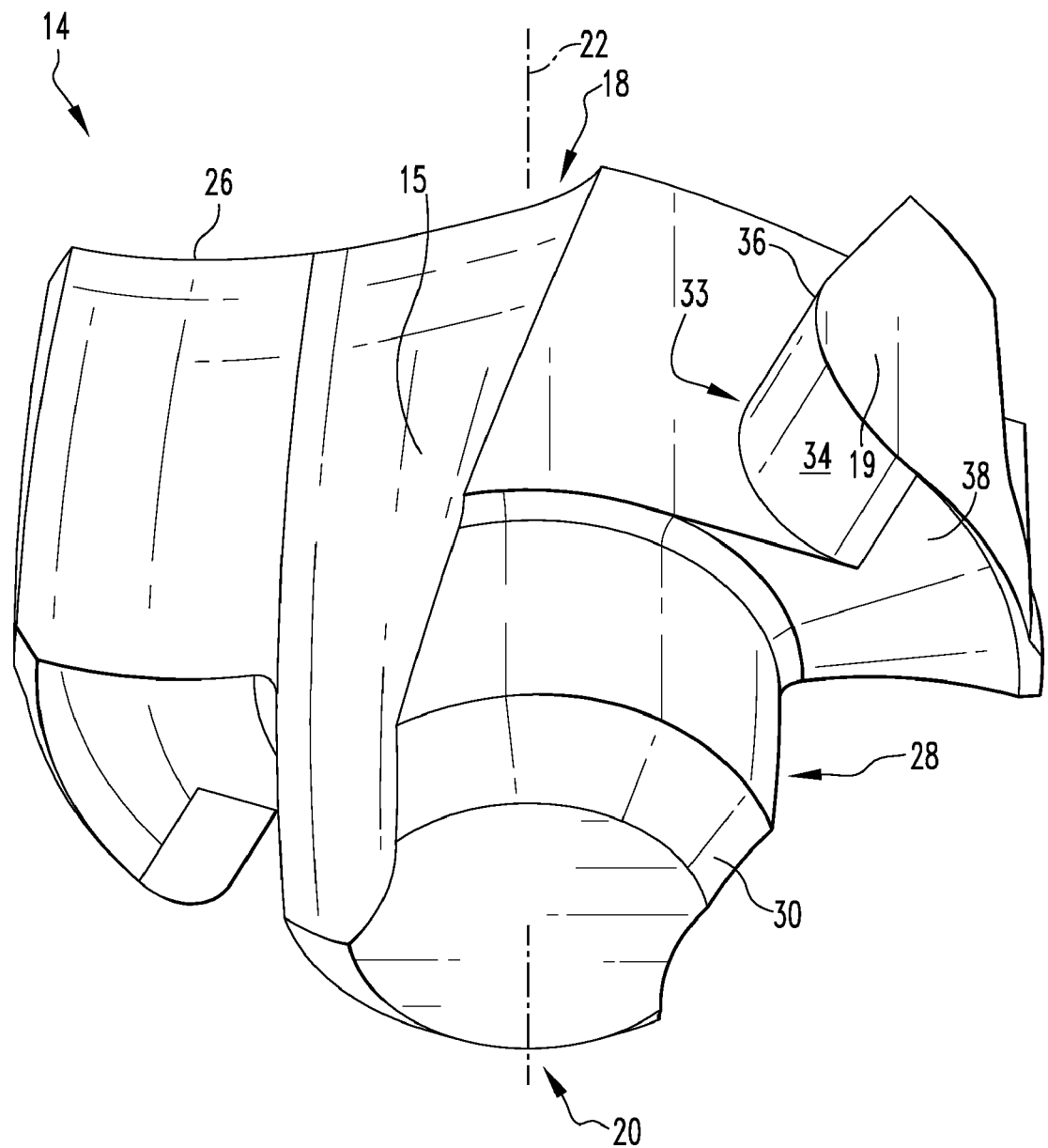
FIG. 2 is an isometric view of the cutting insert of the rotary cutting tool assembly of FIG. 1.
Figure 3:
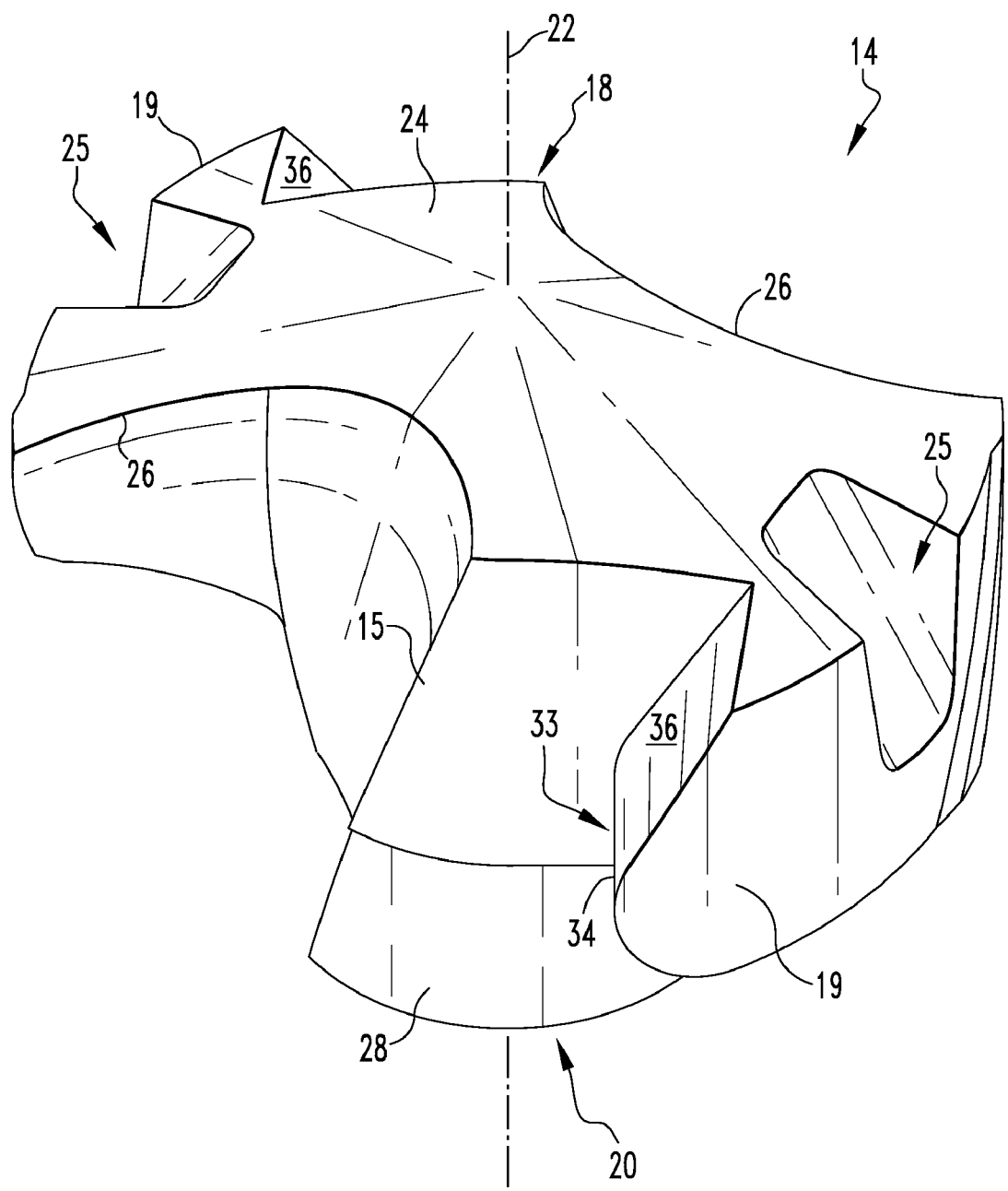
FIG. 3 is another isometric view of the cutting insert of FIG. 1.
Figure 4:
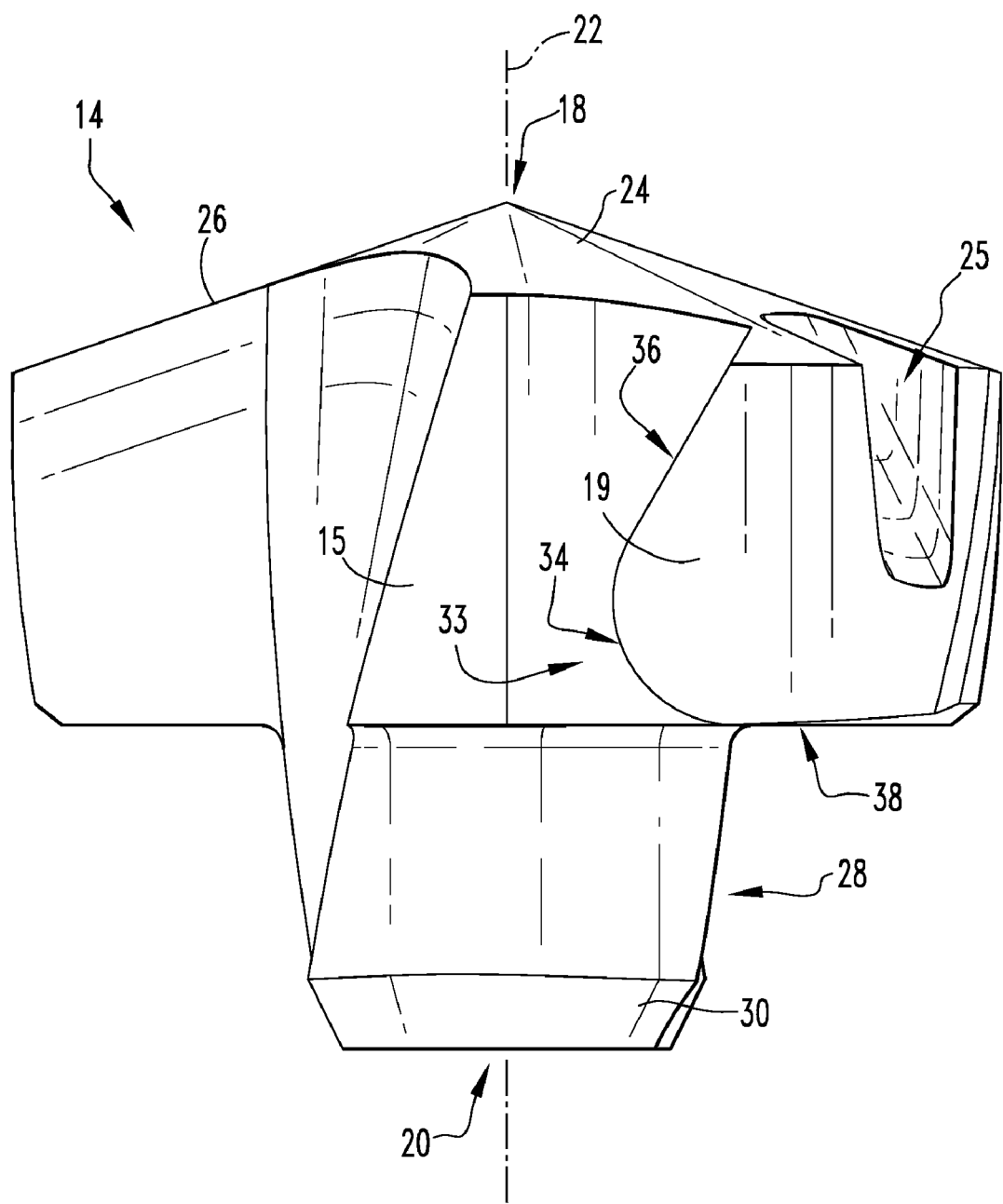
FIG. 4 is an elevation view of the cutting insert of FIGS. 2 and 3.

FIGS. 2-4 show views of the replaceable cutting insert 14 removed from the tool shank 12. Cutting insert 14 includes a central body portion 15 having a first end 18, an opposite second end 20, and a central axis 22. First end 18 includes a generally conical surface 24 (FIGS. 3 and 4) having one or more cutting edges 26 for engaging and machining a workpiece (not shown). Conical surface 24 may further include one or more notches 25 (FIGS. 1, 3 and 4) for engagement by an installation key (not shown) during installation of the cutting insert 14 into the tool body 12, as will be discussed below. The opposite second end 20 of the body portion 15 typically includes a fastening pin 28 having a beveled edge 30. The cutting insert 14 is preferably formed of especially hard metal, such as carbide, cermet, ceramic and high speed steel (HSS), either coated or uncoated. It is possible to provide a cutting insert 14 with Ply-Crystalline Diamond (PCD) or Cubic Boron Nitride (CBN). The cutting insert 14 may be finished either conventionally by polishing, for example, or by means of the so-called "metal injecting molding" (MIM) method.

Extending from the body portion 15 near the first end 18 in a direction generally away from the central axis 22 are one or more protrusions 19 (FIG. 3), each having a driven surface 33. The example shown in FIGS. 1-4 has two protrusions 19, and accordingly two driven surfaces, oriented on generally opposite sides of the cutting insert 14. Generally, the number of driven surfaces will be equal to the number of flutes, however, it is to be appreciated that the number of driven surfaces may vary from the number of flutes as desired for certain applications. Each of the driven surfaces 33 includes a central portion 34 having a generally smooth curved shape (best shown in FIGS. 2 and 4). Extending away from the central portion 34 (best shown in FIG. 2) in a direction generally toward the first end 18 of the body portion 15 is a first portion 36 (best shown in FIGS. 3 and 4) of generally planar shape. Preferably, as shown in the example, first portion 36 is inclined relative to the central axis 22. Extending away from the central portion 34 in a direction generally transverse to the central axis 22 is a second portion 38 (best shown in FIGS. 2 and 4) of generally planar shape. Second portion 38 may also be generally concave in shape (not shown) as long as generally matching surface 58 (discussed below) in shape. It is to be appreciated that the first portion 36, the central portion 34, and the second portion 38 are arranged to form a single continuous surface with the central portion 34 providing a smooth transition between the first and second portions 34,38.

Figure 5:
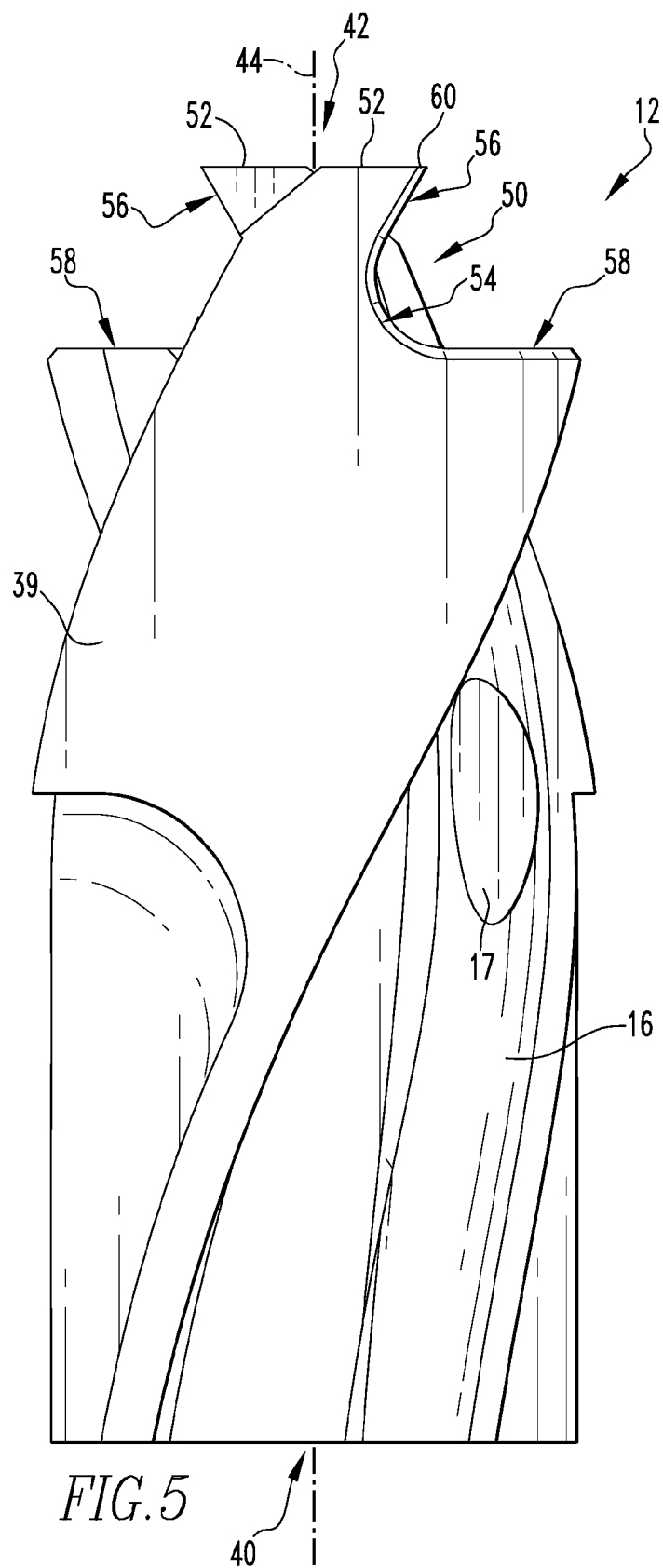
FIG. 5 is an elevation view of the tool body of the rotary cutting tool assembly of FIG. 1.
Figure 6:
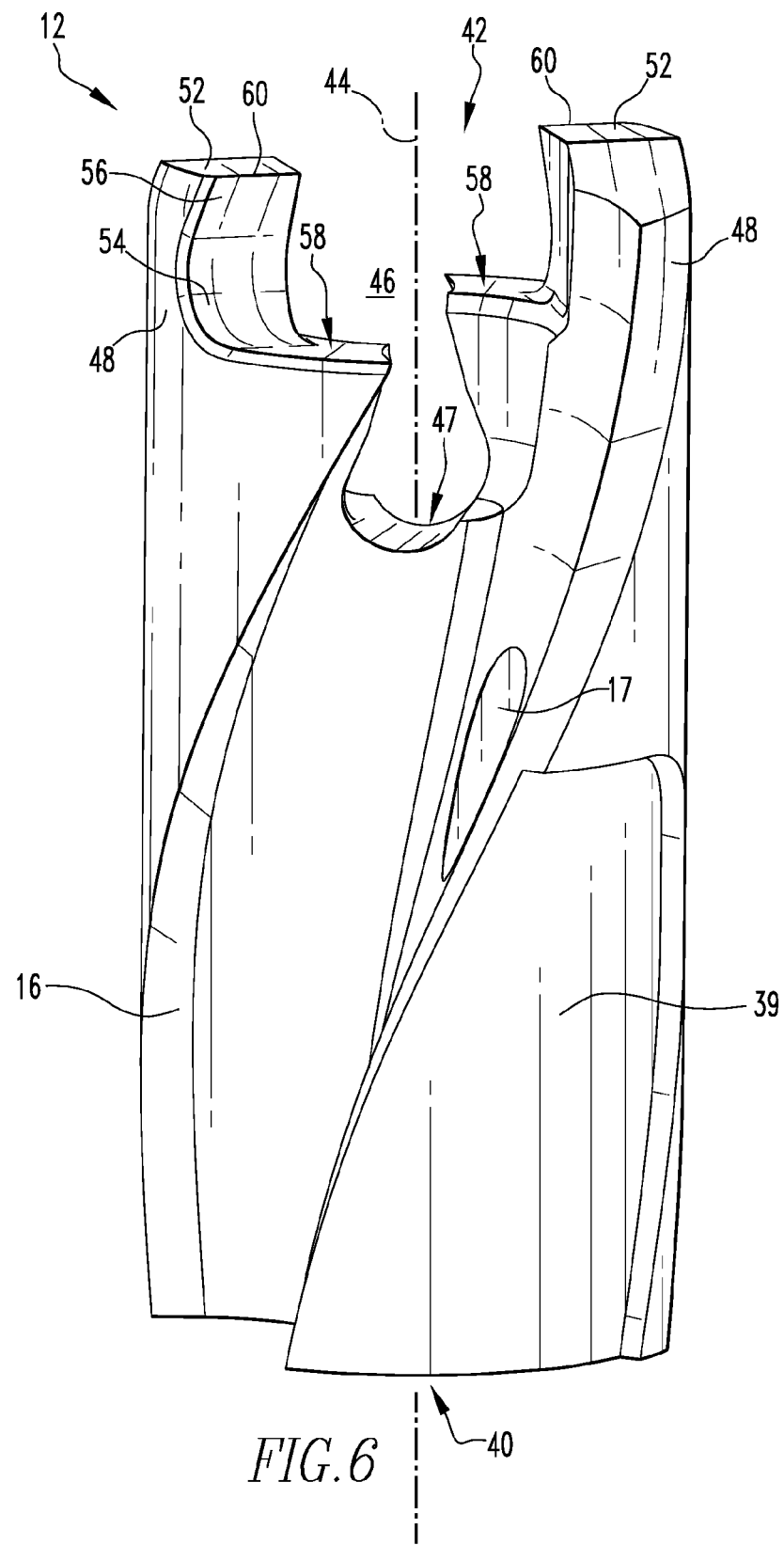
FIG. 6 is another elevation view of the tool body of FIG. 5.
Figure 10:
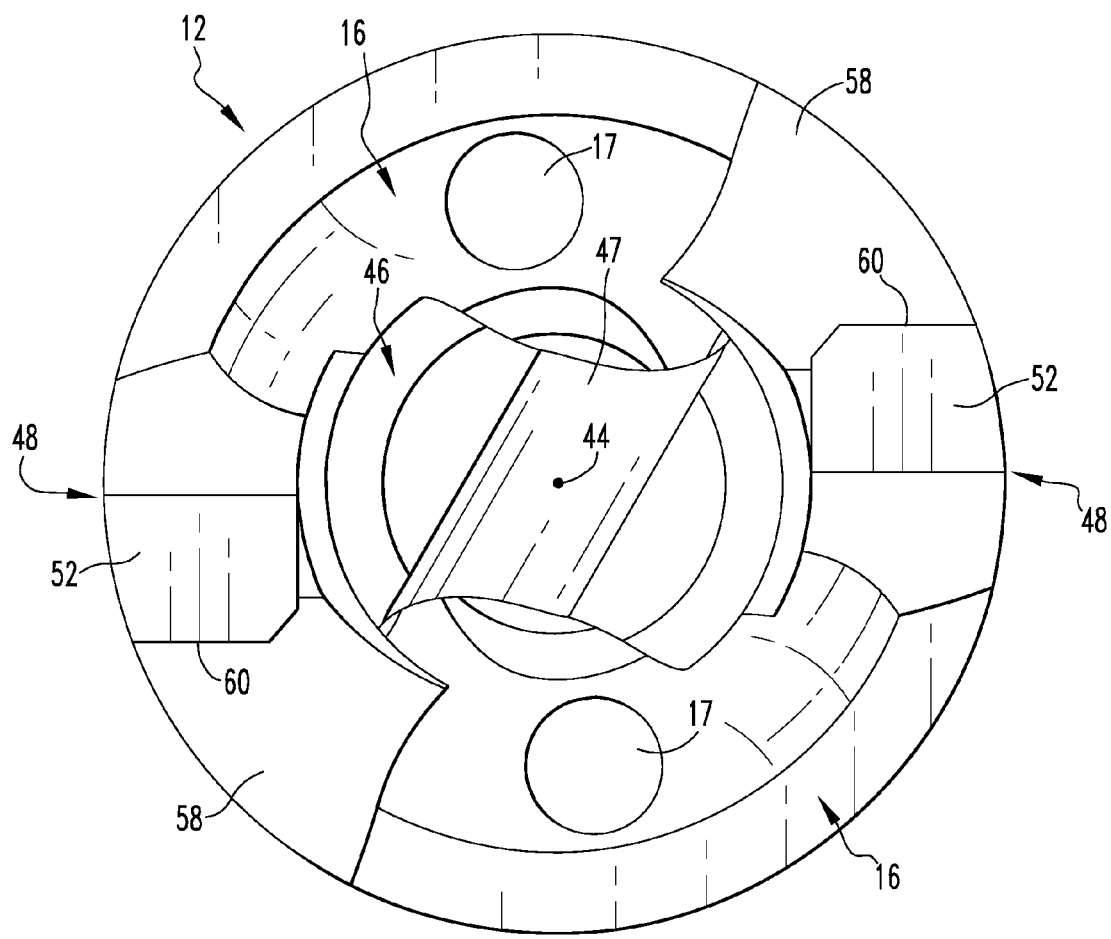
FIG. 10 is a top view of the of the tool body of FIG. 5.

Referring to FIGS. 5, 6 and 10, tool shank 12 having a central axis 44 is shown. The tool shank 12 is advantageously made of steel or another suitably hard metal and includes a generally cylindrical body 39 having a first end 40, an opposite second end 42, and one or more helical flutes 16 or chucking grooves that extend from a tool seat (not shown) to the opposite second end 42 of the tool shank 12. As an alternative to the two helical flutes 16, the tool shank 12 may also be provided with a different quantity of straight or twisted flutes or chucking grooves generally longitudinally along the tool shank 12.

First end 40 of the tool shank 12 is generally configured to be inserted into, and secured in a rotatable tool holder (not shown). Opposite second end 42 includes a recess 46 (shown in FIG. 6) disposed concentric to the central axis 44 generally formed by limb members 48 that extend from the opposite second end 42 of the tool shank 12 and terminate at end surfaces 52. It is to be appreciated that while the example shown in the figures includes two limb members 48, the number of limb members 48 may be varied for specific applications. Recess 46 is of generally circular cross-section that may vary along the axis 44. Recess 46 is generally sized to accommodate fastening pin 28 of the cutting insert 14 when the cutting insert 14 is installed in shank 12 as discussed below. In order to help minimize stresses on the tool shank 12, recess 46 preferably includes a semi-circular groove 47 (FIGS. 6 and 10) at the base of recess 46 oriented generally transverse to central axis 44 (FIG. 10). Groove 47 serves to reduce the stiffness in the lower corners (not numbered) of the recess 46.

Each of the limb members 48 has a drive surface 50 corresponding to a driven surface 33 on the replaceable cutting insert 14. Each drive surface 50 includes a central portion 54 having a generally smooth curved shape (best shown in FIG. 5). Extending away from the central portion 54 in a direction away from cylindrical body 39 is a first portion 56 of generally planar shape. Preferably, the first portion 56 is inclined relative to the central axis 44. Extending away from the central portion 54 in a direction generally transverse to the central axis 44 is a second portion 58 of generally planar shape. Second portion 58 may also be of generally convex shape (not shown), as long as surface 38 of the cutting insert 14 is of generally matching shape (as previously discussed). It is to be appreciated that the first portion 56, the central portion 54, and the second portion 58 are arranged to form a single continuous surface with the central portion 54 providing a smooth transition between the first and second portions 54,58.

Having described the separate parts of the cutting tool assembly, the process of inserting the replaceable cutting insert 14 into the tool shank 12 will now be described. Such process is preferably carried out with a key (not shown) that engages one or more notches 25 in the conical surface 24 of the insert 14. The second end 20 of the cutting insert 14 is initially inserted into the recess 46 at the second end 42 of the tool shank 12. As best shown in FIG. 6, the recess 46 is open to the helical flutes 16. Such opening aids in the installation of the cutting insert 14 into the tool shank 12. As the insert 14 is initially inserted in an axial direction into the tool shank 12, the insert 14 is oriented such that each central portion 34 of the driven surface 33 of each protrusion 19 passes by the edge 60 formed by the first portion 56 of the drive surface 50 and the end surface 52. Generally, insertion continues in the axial direction until the second portion(s) 38 of driven surface(s) 33 contacts the corresponding second portion(s) 58 of drive surface(s) 50. Once such contact is made, the insert 14 is generally rotated (while still being forced in an axial direction against second portion 58 of drive surface 50) until the first portion(s) 36 of the driven surface(s) 33 abuts the first portion(s) 56 of the drive surface(s) 50. In an embodiment where surfaces 38 and 58 are declined relative to plane ρ transverse to the longitudinal axis 11, as is described below, such insertion method is preferred, as it guarantees the proper axial seating of the insert 14 in the tool shank 12. It is to be appreciated that the interaction between the central portion(s) 34 and the first portion(s) 36 of the driven surface 33 and the corresponding central portion(s) 54 and the first portion(s) 56 of the driven surface 50 resulting from the rotation of the insert 14 aids in forcing the insert axially toward the tool shank 12 until the respective central portion(s) 34 of the driven surface(s) 33 and central portion(s) 54 of the drive surface 50 are engaged. It is to be further appreciated that in order to minimize induced stress on the tool shank 12, first portion(s) 36 of the driven surface(s) 33 and first portion(s) 56 of the drive surface(s) 50 should not make contact before the central portion(s) 34 of the driven surface(s) 33 and the central portion(s) 54 of the drive surface(s) 50. In other words, the central portion(s) 34 of the insert 14 needs to have a radius equal to or smaller than the radius of central portion(s) 54 of the tool shank 12. If all the angles match (of first and second portion(s) 36, 56 and 38, 58) and the radiuses of 34 and 54 are equal, the entire surfaces 33 and 50 will make contact, which is acceptable. However, contact between surfaces 36 and 56 without corresponding contact in the curved areas 34 and 54 is not desirable.

It is to be appreciated that removal of the cutting insert 14 from the tool shank 12 may be simply accomplished by reversing the steps described above and may be preferably performed with the aid of a key (not shown) that engages one or more notches 25 in the conical surface 24 of the insert 14.

Having described assembly of the cutting tool assembly 10, interaction of the tool shank 12 and cutting insert 14 during use of the cutting tool assembly 10 in machining will now be described. Referring to FIG. 1, when machining a workpiece (not shown), the cutting tool assembly 10 is rotated about the longitudinal axis 11 in the direction D. As the cutting tool assembly 10 is advanced axially toward the workpiece, the cutting edges 26 of the conical surface 24 engage the workpiece and an axial force is transferred between the cutting insert 14 and the tool shank 12 via engagement of the second portion 38 of each driven surface 33 of the cutting insert 14 and the corresponding second portion 58 of each drive surface 50 of the tool shank 12. Rotational forces are transferred between the tool shank 12 and cutting insert 14 via engagement of the central portion 54 of each drive surface 50 of the tool shank 12 and the corresponding central portion 34 of each driven surface 33 of the cutting insert 14. In order to minimize stresses to the tool shank 12 there is preferably, as previously mentioned, no engagement between the first portion 36 of each driven surface 33 of the cutting insert 14 and the corresponding first portion 56 of each drive surface 50 of the tool shank 12. Such interaction between the tool shank 12 and cutting insert 14 generally continues until the cutting tool assembly 10 is withdrawn from the workpiece.

Upon retraction of the cutting tool assembly 10 from the workpiece, the interaction between the tool shank 12 and the cutting insert 14 changes as the interaction between the workpiece and the cutting insert 14 tends to act against withdrawal of the cutting insert 14. As such, the cutting insert 14 tends to be pulled axially from the tool shank 12. Such axial force is countered by the interaction and engagement of the inclined first portion 56 of each drive surface 50 of the tool shank 12 and the corresponding inclined first portion 36 of each driven surface 33 of the cutting insert 14.

Figure 7:
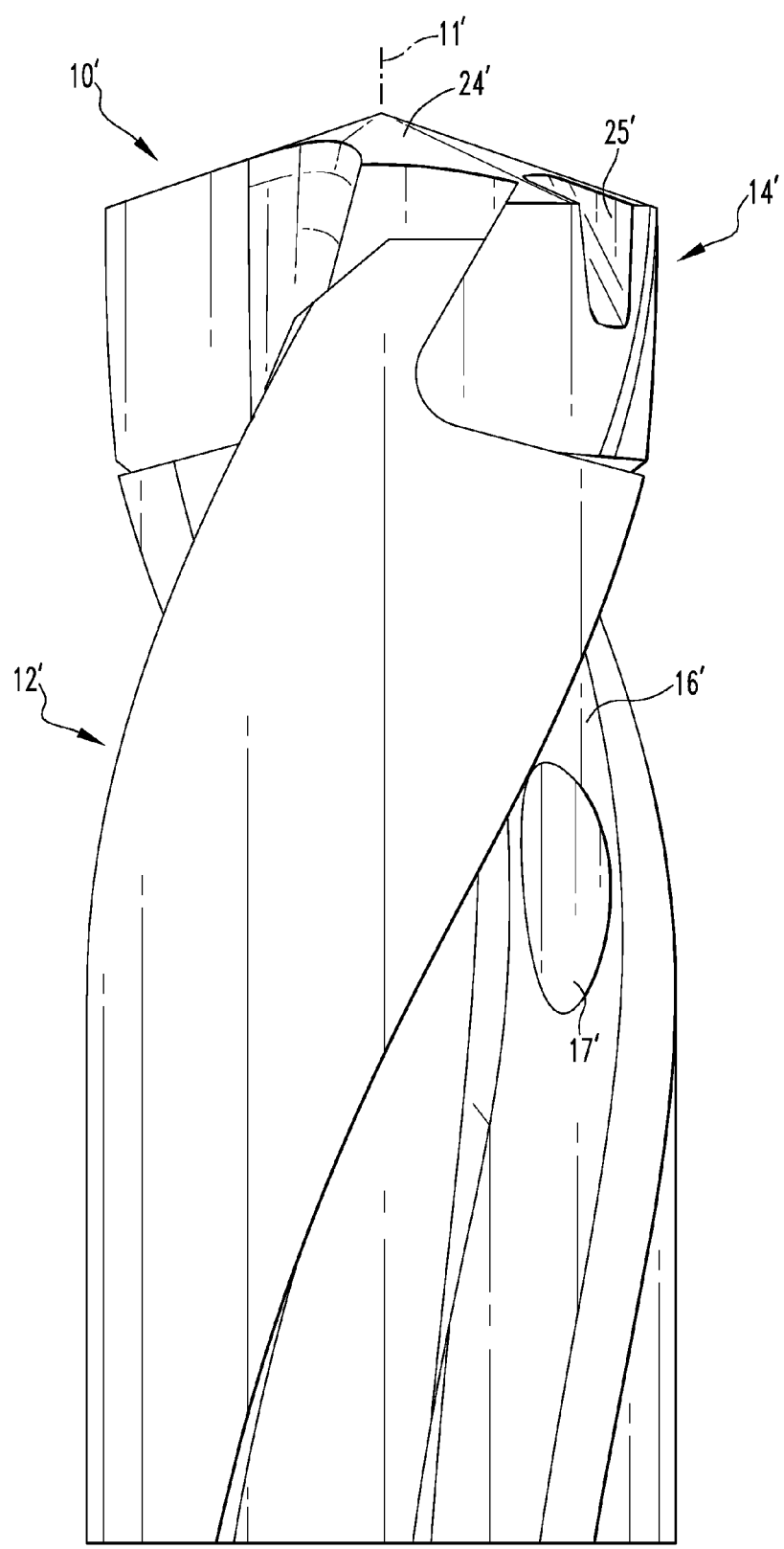
FIG. 7 is an elevation view of a rotary cutting tool assembly in accordance with another embodiment of the invention.
Figure 8:
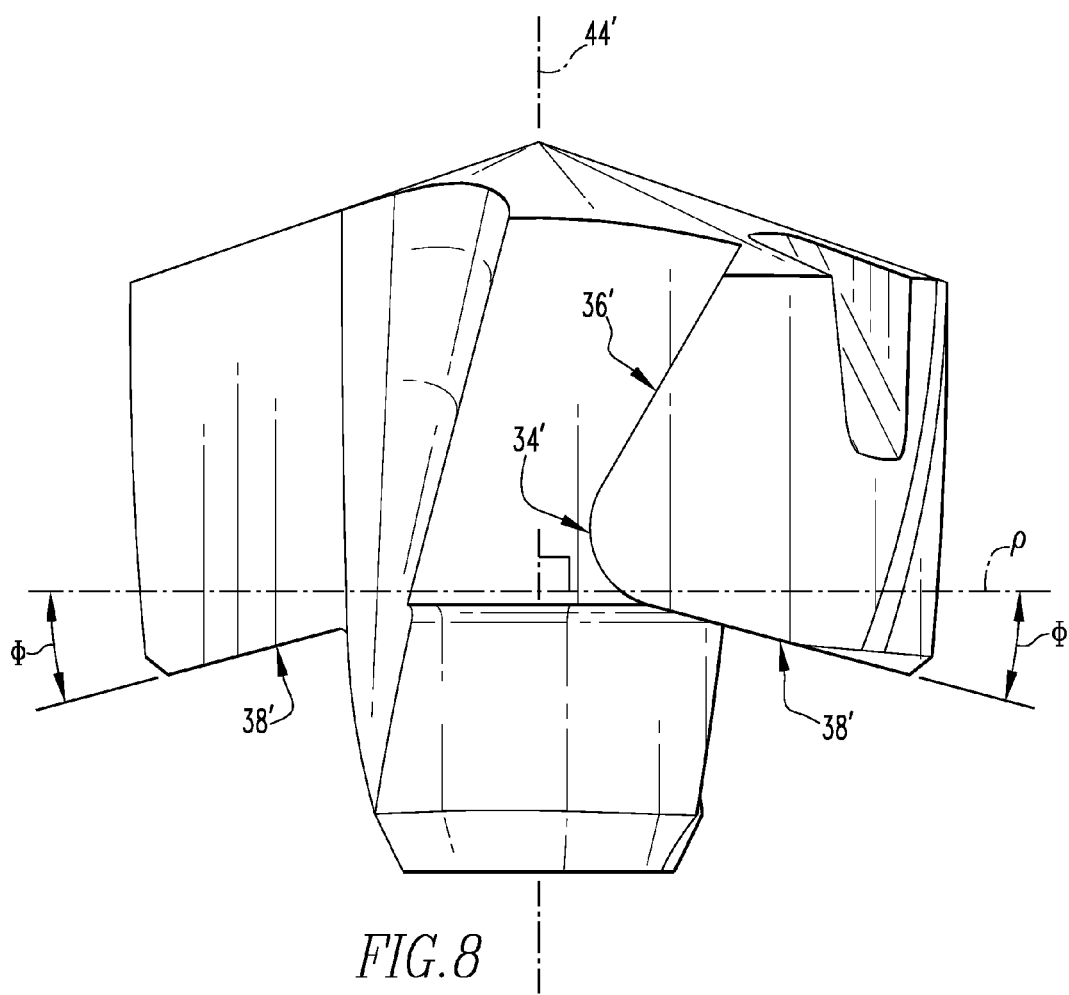
FIG. 8 is an elevation view of the cutting insert of the rotary cutting tool assembly of FIG. 7.
Figure 9:
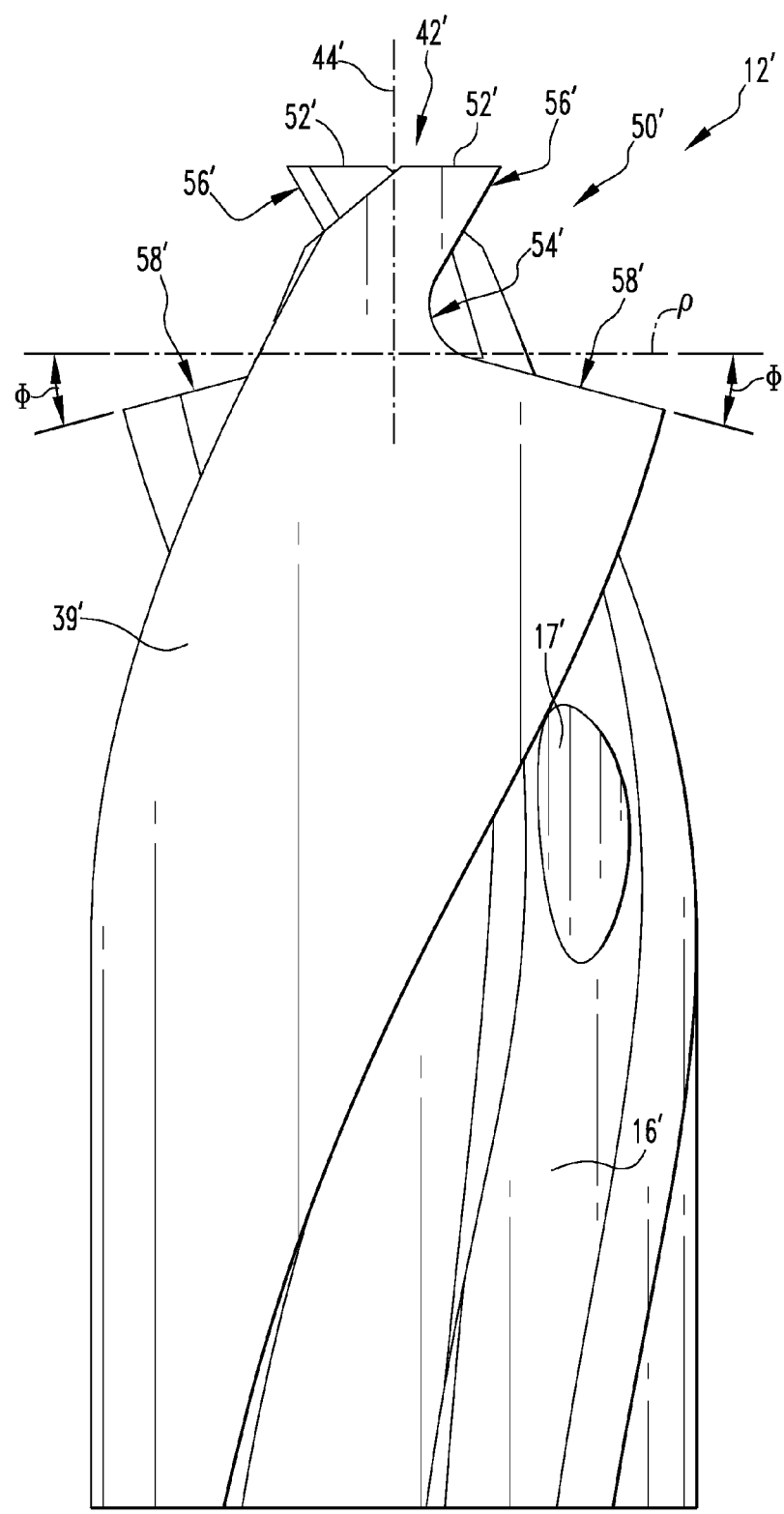
FIG. 9 is an elevation view of the tool body of the rotary cutting tool assembly of FIG. 7.

Referring to FIGS. 7-9, a second example of a cutting tool assembly 10' is shown. The example of FIGS. 7-9 differs from the example of FIGS. 1-6 previously discussed in that the second portion 58' of each drive surface 50' of the tool shank 12' and the second portion 38' of each corresponding driven surface 33' of the cutting insert 14' is declined a declination angle $\Phi$ relative to a plane $\rho$ oriented transverse to the central axis 44'. Such declination of the second portions 38',58' has been found to further reduce stresses involved in the interaction between the tool shank 12' and the cutting insert 14'. Such declination angle $\Phi$ is generally in the range of about 0 degrees (as in the previous embodiment) to about 45 degrees. Preferably, the declination angle $\Phi$ is in the range of about 5 degrees to about 20 degrees, however, it is to be appreciated that the declination angle may be vary outside of such range as desired for certain applications. It is to be appreciated that installation, as well as removal, of a cutting insert 14' in a tool shank 12' is the same as that previously discussed in the previous example of FIGS. 1-6. Additionally, the general interaction of the cutting insert 14' and the tool shank 12' are the same as described for that previous example.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A cutting insert for a rotary cutting tool, said rotary cutting tool comprising a tool shank having a first end portion and an opposite second end portion, said first end portion being configured to be inserted into a tool holder, said opposite second end portion having a recess for accommodating said cutting insert and a drive surface adjacent said recess, said cutting insert comprising:
    a body portion having a first end, an opposite second end, and a central axis, the opposite second end of said body portion structured to be inserted into the recess of the opposite second end portion of said tool shank; and
    a driven surface extending from said body portion generally away from said central axis, said driven surface comprising:
        a central portion;
        a first portion of generally planar shape extending away from said central portion in a direction generally toward the first end of said body portion; and
        a second portion extending away from said central portion in a direction generally transverse to said central axis,
    wherein said central portion comprises a curved surface transitioning between the first portion and the second portion of said driven surface and wherein a portion of said driven surface is structured to be engaged by a corresponding portion of said drive surface.

2. The cutting insert of claim 1 wherein the portion of said driven surface comprises the central portion and the second portion when the rotary cutting tool is cutting a workpiece.

3. The cutting insert of claim 1 wherein the first portion of said driven surface is generally inclined at an angle with respect to said central axis.

4. The cutting insert of claim 3 wherein the portion of said driven surface comprises the first portion of said driven surface when the rotary cutting tool is being withdrawn from a workpiece.

5. The cutting insert of claim 1 wherein the second portion is generally declined at a declination angle with respect to a plane transverse to said central axis.

6. The cutting insert of claim 5 wherein the declination angle is in a range of about 5 degrees to about 20 degrees.

7. The cutting insert of claim 1 wherein the first portion of said driven surface is generally inclined at a first angle with respect to said central axis and the second portion of said driven surface is generally declined at a second angle with respect to a plane transverse to said central axis.

8. A rotary cutting tool comprising:
    a tool shank having a first end portion and an opposite second end portion, said first end portion being configured to be inserted into a tool holder, said opposite second end portion having a recess and a drive surface adjacent said recess; and
    a cutting insert comprising:
        a body portion having a first end, an opposite second end, and a central axis, the opposite second end of said body portion inserted into the recess of the opposite second end portion of said tool shank; and
        a driven surface extending from said body portion generally away from said central axis, said driven surface comprising:
            a central portion;
            a first portion of generally planar shape extending away from said central portion in a direction generally toward the first end of said body portion; and
            a second portion extending away from said central portion in a direction generally transverse to said central axis,
    wherein said central portion comprises a curved surface transitioning between the first portion and the second portion of said driven surface and wherein a portion of said driven surface is engaged by a corresponding portion of said drive surface.

9. The rotary cutting tool of claim 8 wherein the portion of said driven surface comprises the central portion and the second portion when the rotary cutting tool is cutting a workpiece.

10. The rotary cutting tool of claim 8 wherein the first portion of said driven surface is generally inclined at an angle with respect to said central axis.

11. The rotary cutting tool of claim 10 wherein the portion of said driven surface comprises the first portion of said driven surface when the rotary cutting tool is being withdrawn from a workpiece.

12. The rotary cutting tool of claim 8 wherein the second portion is generally declined at a declination angle with respect to a plane transverse to said central axis.

13. The rotary cutting tool of claim 12 wherein the declination angle is in a range of about 5 degrees to about 20 degrees.

14. The rotary cutting tool of claim 8 wherein the first portion of said driven surface is generally inclined at a first angle with respect to said central axis and the second portion of said driven surface is generally declined at a second angle with respect to a plane transverse to said central axis.

15. The rotary cutting tool of claim 8 wherein said recess comprises a groove.

16. The rotary cutting tool of claim 12 wherein said recess comprises a groove.

17. A tool shank for a rotary cutting tool, said rotary cutting tool comprising a cutting insert comprising a body portion having a first end, an opposite second end, and a first central axis, and a driven surface extending from said body portion generally away from said first central axis, said tool shank comprising:
- a generally cylindrical body having a first end portion, an opposite second end portion, and a second central axis, said first end portion structured to be inserted into a tool holder, said opposite second end portion comprising:
  - a recess structured to accommodate the opposite second end of said cutting insert;
  - a drive surface adjacent said recess, said drive surface comprising:
    - a central portion;
    - a first portion of generally planar shape extending away from said central portion in a direction generally away from said cylindrical body; and
    - a second portion extending away from said central portion in a direction generally transverse to said second central axis,
  - wherein said central portion comprises a curved surface transitioning between the first portion and the second portion of said drive surface and wherein a portion of the central portion of said drive surface is structured to engage a corresponding portion of said driven surface.

18. The tool shank of claim 17 wherein the second portion of said drive surface is also structured to engage another corresponding portion of said driven surface when the rotary cutting tool is cutting a workpiece.

19. The tool shank of claim 17 wherein the first portion of said drive surface is generally inclined at an angle with respect to said second central axis.

20. The tool shank of claim 19 wherein the first portion of said drive surface is also structured to engage another corresponding portion of said driven surface when the rotary cutting tool is being withdrawn from a workpiece.

21. The tool shank of claim 17 wherein the second portion is generally declined at a declination angle with respect to a plane transverse to said second central axis.

22. The tool shank of claim 21 wherein the declination angle is in a range of about 5 degrees to about 20 degrees.

23. The tool shank of claim 17 wherein the first portion of said drive surface is generally inclined at a first angle with respect to said second central axis and the second portion of said drive surface is generally declined at a second angle with respect to a plane transverse to said second central axis.

24. The tool shank of claim 17 wherein said recess comprises a groove.

25. The tool shank of claim 21 wherein said recess comprises a groove.

* * * * *